July 15, 1924.
O. KEAN ET AL
UMBRELLA
Filed Nov. 19, 1921    4 Sheets-Sheet 2
1,501,560
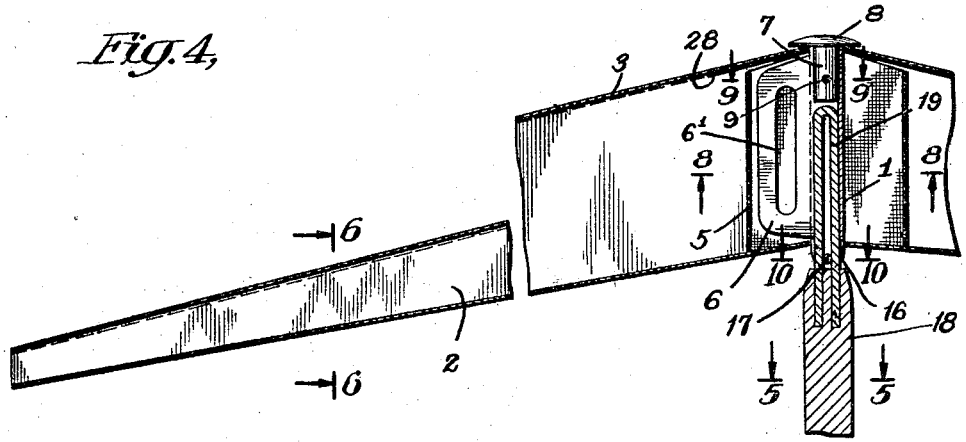
Fig. 4,
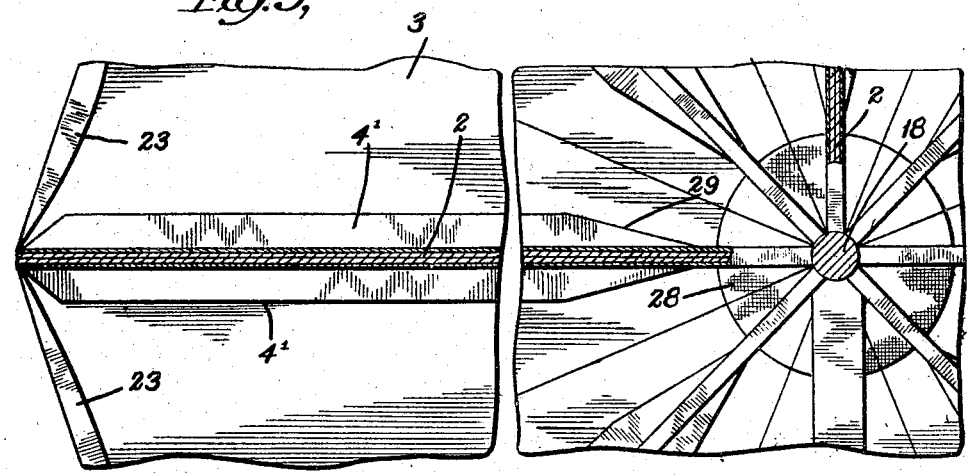
Fig. 5,
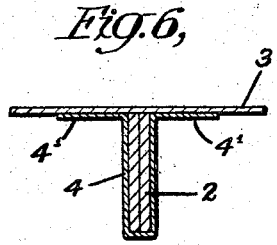
Fig. 6,
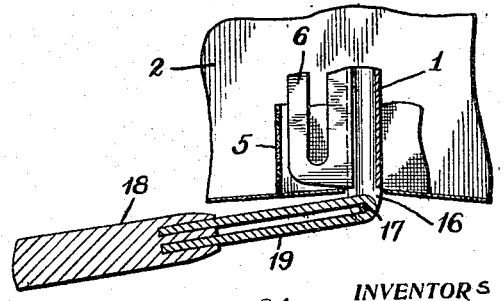
Fig. 7,
INVENTORS
Otis Kean and
Albert R. Wilson
BY Dyer Smith
their ATTORNEY

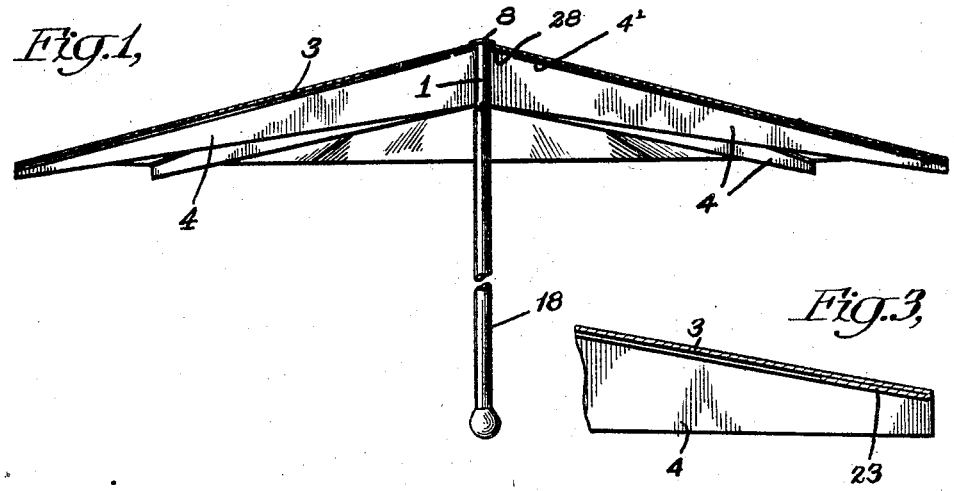
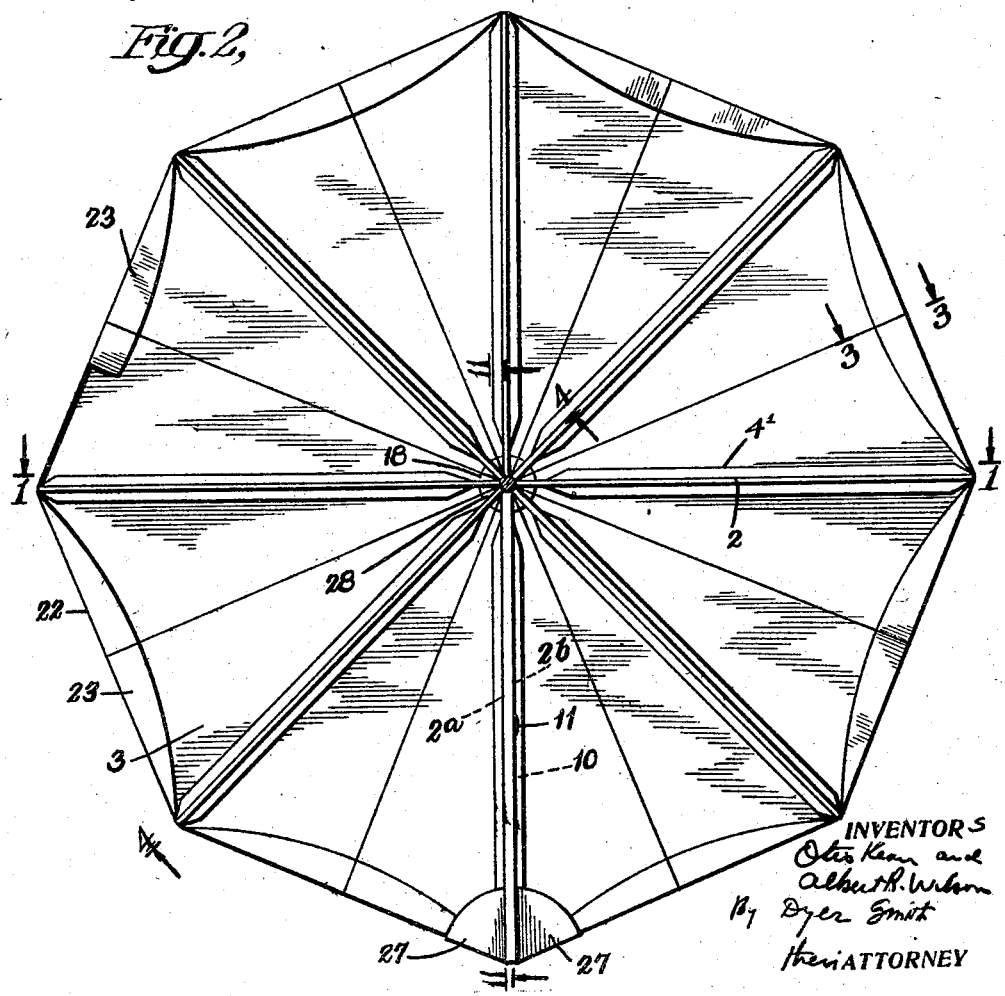

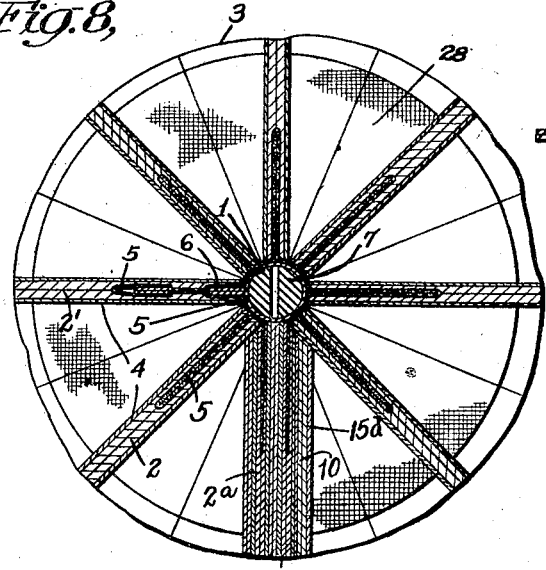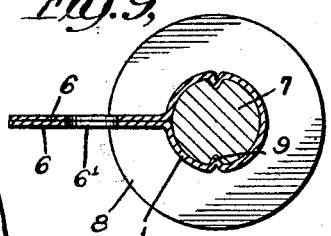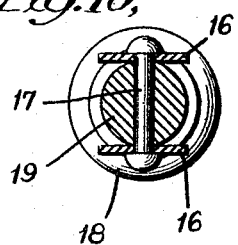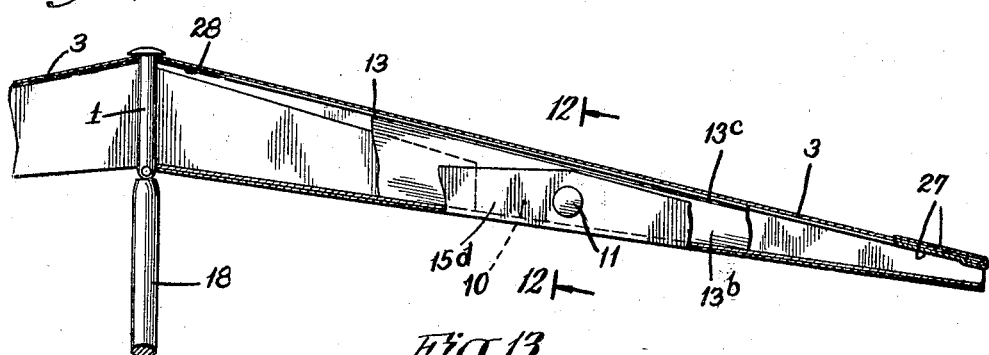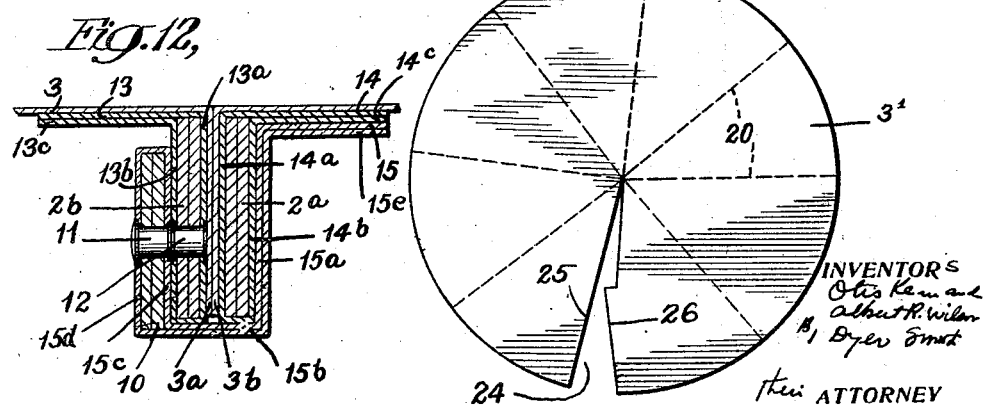

July 15, 1924.
O. KEAN ET AL
UMBRELLA
Filed Nov. 19, 1921    4 Sheets-Sheet 4
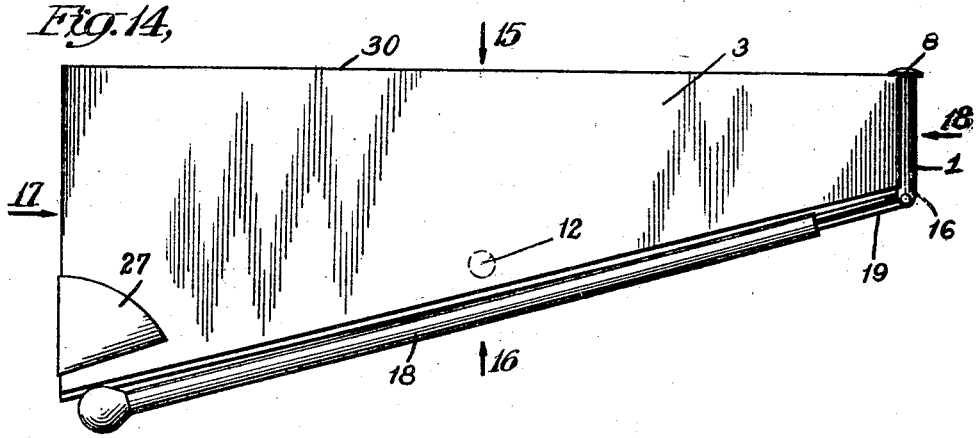
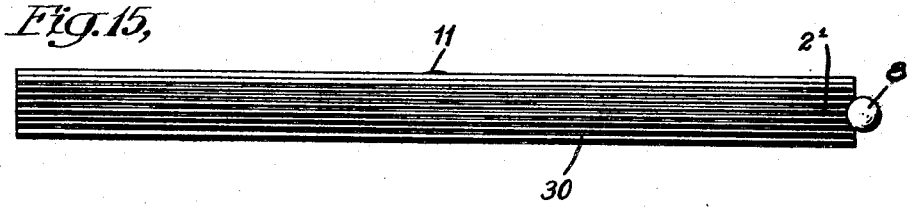
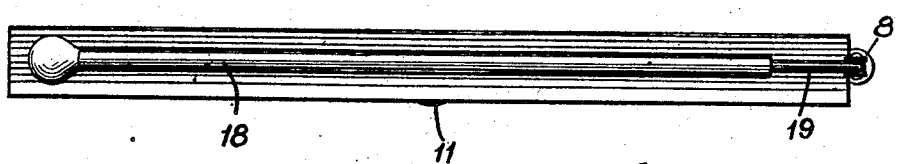
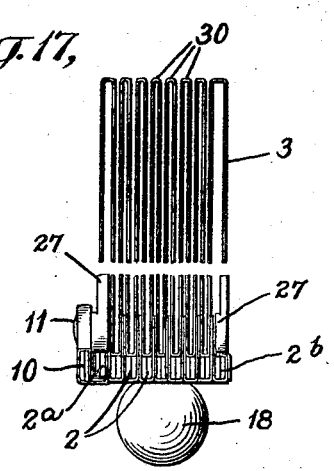
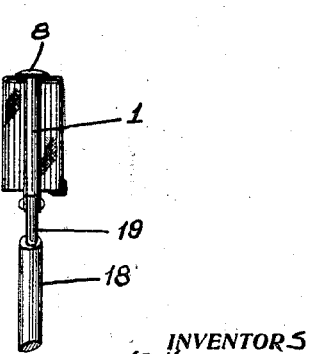
INVENTORS
Otis Kean and
Albert R. Wilson
BY Dyer Smith
Their ATTORNEY

Patented July 15, 1924.

UNITED STATES PATENT OFFICE.

OTIS KEAN AND ALBERT R. WILSON, OF NEW YORK, N. Y., ASSIGNORS TO PAPER-BRELLA CORPORATION, A CORPORATION OF NEW YORK.

UMBRELLA.

Application filed November 19, 1921. Serial No. 516,264.

*To all whom it may concern:*

Be it known that we, OTIS KEAN and ALBERT R. WILSON, both citizens of the United States, and residents of New York city, in the county of New York and State of New York, have invented certain new and useful Improvements in Umbrellas, of which the following is a specification.

The invention relates to a novel form of umbrella. An object of the invention is to provide a simple and effective construction and particularly one which may be manufactured of comparatively inexpensive material, and with a minimum amount of labor so that the article may be sold for a low price. The umbrella is particularly intended to utilize impregnated or treated paper for the covering thereof although the invention is not limited in this regard. Other objects of the invention consist in the provision of improved details of construction and combinations of parts all as will appear more fully in the following specification and be particularly pointed out in the appended claims.

In the preferred form of construction a plurality of frame members are pivotally connected at one end of each of the same to a vertical support, these frame members being adapted to lie one on the other when the umbrella is closed, at one side of the vertical support, with the covering carried by the frame members arranged in folds one on the other so that a flat package is presented. When the umbrella is to be opened the frame members are swung around the support into radiating positions and adjacent edges of the covering brought together and secured together in such a manner as to effect a rain tight closure between the same. The handle member is preferably hingedly connected to the vertical support to which the frame members are pivoted, so that it may extend alongside the frame members when the umbrella is closed into the flat form referred to, the handle being swung into proper upright position when the umbrella is to be used.

In order that the invention may be more clearly understood attention is hereby directed to the accompanying drawings forming part of this application and illustrating one embodiment thereof. In the drawings—

Fig. 1 represents a vertical section taken on line 1—1 of Fig. 2;

Fig. 2 is a bottom plan view of the umbrella in open position the handle member not being shown;

Fig. 3 is a partial section taken on line 3—3 of Fig. 2;

Fig. 4 is an enlarged sectional view taken on line 4—4 of Fig. 2;

Figs. 5 and 6 are sections taken respectively on line 5—5 and 6—6 of Fig. 4;

Fig. 7 is a partial vertical section taken through the connection betwmeen the handle member and the vertical support;

Figs. 8, 9 and 10 are enlarged sections taken respectively on line 8—8 and 9—9 and 10—10, of Fig. 4;

Fig. 11 is an enlarged section taken on line 11—11 of Fig. 2;

Fig. 12 is a section taken on line 12—12 of Fig. 11;

Fig. 13 is a plan view of a sheet from which the covering member of the umbrella may be formed;

Fig. 14 is a side elevation of the umbrella in folded or closed position, and

Figs. 15, 16, 17 and 18 are respectively top and bottom views of the umbrella shown in Fig. 14, viewed in the directions shown by the arrows 15 and 16 in Fig. 14, and end elevations of the umbrella shown in Fig. 14 as viewed in the directions shown by the arrows 17 and 18 indicated in Fig. 14.

Referring to the drawings, in the embodiment illustrated the umbrella comprises a central vertical support 1 which preferably takes the form of a short tubular metal ferrule. The frame members 2, 2, are hingedly connected to support 1 at their inner ends so as to swing thereabout, and carry the covering 3.

The frame members 2 are preferably formed of flat strips of fibrous material such as cardboard or the like, these strips being positioned vertically beneath the covering. They preferably are secured to the underside of the covering by means of flexible strips 4 (Fig. 6), these strips preferably being formed of paper. Each strip 4 extends lengthwise of a frame member 2 and extends around the same and is bent to provide flanges $4^1$ which are secured to the under side of the covering member 3, preferably by a suitable adhesive.

Each frame member 2 is preferably formed of a section which increases in height from the outer to the inner end of the same so that a girder construction is presented of a strength which may readily be calculated as more than sufficient for the purpose in connection with the particular material used. In practice we have found that cardboard strips of a thickness of say an eighth of an inch and a height of say two inches at the inner ends of the same, for a length of frame member of say eighteen inches, answers the purpose very well.

The frame members 2 are hingedly connected to support 1 in such a manner that they may lie flat one upon the other as shown in Figures 14 to 18, and be capable of swinging about the tubular support 1 when the umbrella is opened. In the preferred form of the invention the hinge connection referred to is formed of a flexible tape or textile member 5 which is secured by adhesive to the adjacent inner ends of all the frame members.

The tubular support 1 is preferably formed of a strip of metal bent into tubular form with a pair of flanges 6, 6, extending outwardly from the tubular portion and pressed into engagement with each other, as is shown in Fig. 9. The flanges 6 are rigidly secured to one of the frame members 2. The umbrella is preferably provided with an odd number of frame members, such as nine, and the flanges 6 of the vertical support will then be secured to the central one of these frame members, this member being indicated at $2^1$ in Figs. 8 and 15, with a like number of frame members above and below the same when the umbrella lies in flat closed position.

The tape 5 by which the frame members are to be secured in position is preferably secured to the various frame members by splitting the ends of the same and inserting a fold of the tape into the opening thus made, as is indicated in Fig. 8. When the frame members are made of cardboard, or the like, having different plies, as is indicated in the drawings, a pair of plies may very readily be separated for a short distance at the inner end of each frame member and a fold of the tape 5, suitably covered with adhesive, inserted therein. One fold of the tape 5 will be extended about the flanges 6 of support 1 and inserted with flanges 6 into the opening thus formed at the end of the central frame member $2^1$. The flanges 6 are preferably provided with aligned openings $6^1$ therethrough and the folds of the tape on opposite sides of flanges 6 may be secured together by adhesive through the openings $6^1$. This construction is shown in Figs. 9 and 4.

The upper end of the tubular support 1 is preferably closed by a plug 7 which may be formed of wood, or the like, this plug being provided with a head or enlargement of cross member 8 at its upper end. The plug may be secured in position by any suitable means, as by pricking the metal of the ferrule 1 slightly into the same, as is indicated at 9, Figs. 4 and 9.

The frame members 2 are hingedly connected to the support 1 below the cap 8 and preferably are of such height, at their inner ends, as to extend from the bottom of the tubular support 1 to a point just below the cap piece 8, the frame members being firmly secured in position by the tape 5 throughout this distance.

The frame members preferably extend downwardly and outwardly from the support 1 at a comparatively slight angle. The umbrella may be opened by grasping the ends of the top and bottom frame members and swinging the same around support 1 until the said top and bottom frame members come into engagement with each other, this position being shown in Fig. 2. During this opening movement the frame members 2 will swing about support 1 while maintaining approximately the same angle therewith at all times. The members 2 will swing into such positions as are permitted thereto by the unfolding of the covering member 3. It will be noted from Figs. 2 and 12 that the top and bottom frame members $2^a$ and $2^b$ when brought together into engaging position then constitute in effect a single frame member, all of the frame members then extending radially from support 1 at equal angles throughout the circle.

Various means may be used for making a rain tight closure at the meeting edges of the covering 3 when the umbrella is opened. In the preferred form of the invention one of the two frame member $2^a$ has a flap 10 hingedly secured to the lower edge of the same. When the frame members $2^a$ and $2^b$ are brought together as stated the flap or pivoted member 10 is extended around the lower edge of the adjacent frame member $2^b$ and is removably secured thereto. This may readily be accomplished in various ways, the preferred method being to provide the members $2^b$ and 10 with the coacting parts of a glove button fastener, or the like, the flap 10 being shown as provided with member 11, which is adapted to be pushed into the coacting socket member 12 carried by the frame member $2^b$.

It is obvious that with this device the umbrella will be held in open position and also that a rain proof closure will be effected since the hinge portion of the flap member 10 will serve as a gutter along which any water which finds its way between the adjacent members $2^a$ and $2^b$ may run, and so be carried off the edge of the umbrella.

The two end frame members $2^a$ and $2^b$ are preferably secured to the covering 3 in the manner indicated in Fig. 12. The frame member 2$^b$ is held in place by a paper strip running lengthwise of the frame member, this strip having a portion 13 which is pasted to the under side of the covering member 3. This strip bends downwardly alongside member 2$^b$ as shown at 13$^a$, and then goes around the bottom of the frame member and up on the other side of the same, as indicated at 13$^b$, this strip then being pasted to the under side of the flange 13, as is shown at 13$^c$. The frame member 2$^a$ is similarly held in position by a strip having a portion 14 pasted to the under side of the covering member 3 and extending around member 2$^a$ in the same manner as just described, this strip having a flange 14$^c$ pasted to the under side of the portion indicated at 14. The covering member 3 has its edge portions extending downwardly over and secured to the portions 13$^a$ and 14$^a$ of strips 13 and 14, these flanges of members 3 being indicated at 3$^a$ and 3$^b$.

The flap 10 is held in place by a paper strip running lengthwise of the same, and having a flange 15 pasted to the under side of the flange 14$^c$. This securing strip then extends downwardly, as indicated at 15$^a$, alongside the portion 14$^b$ of strip 14, then horizontally under member 2$^a$, as is indicated at 15$^b$, then up and around flap 10, as is indicated at 15$^c$ and 15$^d$ and returning under portion 15$^b$ and up outside of portion 15$^a$ to a final flange 15$^e$ which is pasted to the under side of flange 15.

The manner in which the handle member is secured in place will now be described. Preferably the tubular ferrule 1 is provided at its lower ends with a pair of parallel ears 16 through which extend a pivot pin 17. The handle member 18 is pivotally supported from pin 17 by means of a wire 19 which is looped around pin 17, the two ends of this wire being driven into the upper end of handle member 18. Preferably the wire 19 is made half round, as shown in the sectional view Fig. 10. When the umbrella is in its closed and folded position, the handle is swung into position in which it lies against the adjacent edge of the package, as is indicated in Figs. 14 and 16. When the umbrella is opened the handle member is swung from the position shown in Fig. 7 into the vertical position shown in Fig. 4 in which the wire 19 will slide upwardly within the interior of tube 1, until the upper end of the handle member 18 comes into contact with the lower edges of ears 16, the wire 19 being of suitable size to slidingly fit within tube 1.

The covering member 3 is preferably formed from a circular sheet, indicated as 3$^1$ in Fig. 13. The positions of the frame members are indicated by the dash lines 20. The material between the ends of each pair of adjacent lines 20 may be cut off or folded over to form the edges 22 of the umbrella (Fig. 2), these edges comprising the chords sub-tending the arcs of the circle extending between the ends of the lines 20. Instead of cutting off this material it is preferably folded under, as indicated in 23 at Fig. 2, and pasted to the under surface of the covering 3 to form reinforcements extending around the edges.

In order that the covering may have the proper conical shape when the umbrella is opened it is necessary to cut out a sector from the circular piece 3$^1$, as is indicated at 24 in Fig. 13. The adjacent edges of the paper at this cut-out will be pasted to the side surfaces of the end frame members 2$^a$ and 2$^b$ which are adapted to come together in the manner indicated in Fig. 12.

At the point at which this sector is cut out, the paper may be cut along a radial line at one side, as is indicated in Fig. 13 at 25. On the other side, however, it is advisable to cut the paper at a sharper angle inwardly, as is indicated at 26, so as to provide a pasting flap. When the paper is thus cut there will be not quite enough to cover the inner, or larger end of the frame member against which the portion 26 of the paper is pasted. This difficulty may be overcome in a simple and economical manner by taking the strip of paper which was cut out between the lines 25 and 26 and extending inwardly to the center of the circle and reversing this strip of paper so that the larger end of the same is inward and the smaller end is outward and pasting this strip against the adjacent surface of the frame member which is to be covered.

It is desirable to reinforce the covering member 3 at the portions of the same adjacent the outer ends of frame members 2$^a$ and 2$^b$ which are grasped by the hands in opening and closing the umbrella. Accordingly we have shown reinforcing strips of paper 27, 27, which may be pasted around the outer edges of the covering at these points, to present surfaces extending over both the upper and the under surface of the covering for a short distance, as is indicated in Figs. 2, 11 and 14.

Also for purposes of reinforcement a disc of paper 28 is preferably pasted to the under side of covering member 3 surrounding the supporting member 1. It will be noted that the flanges 4$^1$ of the strips 4 by which the frame members 2 are secured to the under side of covering member 3 are tapered off at their inner ends, as indicated at 29 Fig. 5, and end at a point slightly outside of the reinforcing disc 28. Accordingly there is no adhesive connection between the frame members and the covering member 3 between the vertical support 1 and the inner ends of the flanges 4$^1$, it being found that the paper would pucker or wrinkle if the flanges 4¹ were pasted to the covering member 3 all the way into the center.

The appearance of the umbrella in its closed condition is clearly indicated by Figs. 14 to 18. It will be noted that the paper covering is bent along the fold lines 30 so that it will arrange itself in flat folds one upon the other when closed as is illustrated.

The covering 3 may be formed of a suitable strong paper impregnated or coated with a suitable waterproofing composition. Preferably when the umbrella has been put together the entire structure is dipped into a suitable waterproofing bath so as to impregnate all parts of the same.

It should be understood that the invention is not limited strictly to the details of construction described but is as broad as is indicated by the accompanying claims.

What we claim is:

1. In a device of the character described, the combination of a single cylindrical vertical support, a plurality of frame members comprising rigid flat strips hingedly connected thereto at their inner ends, with their widthwise dimensions vertical, in such manner as to lie side by side in planes parallel to the axis of said support, when closed, and to swing about said support into radiating positions with their inner ends abutting against said support, when opened, and a flexible covering extending over said frame members.

2. In a device of the character described, the combination of a single cylindrical vertical support, a plurality of rigid integral straight frame members hingedly connected thereto at their inner ends, in such manner as to lie side by side in planes parallel to the axis of said support, when closed, and to swing about said support into radiating positions with their inner ends abutting against said support, when opened, and a flexible covering extending over said frame members.

3. In a device of the character described, the combination of a single cylindrical vertical support, a plurality of frame members comprising rigid flat strips hingedly connected thereto at their inner ends, with their widthwise dimensions vertical, in such manner as to lie in parallel relations when closed and to swing about said support into radiating positions when opened, with their inner ends abutting against a substantial portion of the length of said support, and a flexible covering extending over said frame members.

4. In a device of the character described, the combination of a single cylindrical vertical support, a plurality of frame members comprising rigid flat strips hingedly connected thereto at their inner ends, with their widthwise dimensions vertical, in such manner as to lie side by side in planes parallel to the axis of said support, when closed, and to swing about said support into radiating positions with their inner ends abutting against said support, when opened, a flexible covering extending over and secured to said frame members in such manner as to have two edges radiating from said support, and means for effecting a rain-tight closure between said edges when the umbrella is opened.

5. In an umbrella, the combination of a single cylindrical vertical support, a rigid straight frame member having one end fixedly secured thereto, and extending at an angle therefrom, a plurality of other rigid straight frame members hingedly connected to said support in positions to lie at opposite sides of said first member, in planes parallel to said first member and to the axis of said support when the umbrella is closed, and to swing into radiating positions with their inner ends abutting against said support when the umbrella is opened, a flexible covering extending over and secured to said frame members in such manner as to have two edges radiating from said support, and means for effecting a rain-tight closure between said edges when the umbrella is opened.

6. In an umbrella, the combination of a vertical support, a frame member having one end fixedly secured thereto, and extending at an angle therefrom, a plurality of other frame members positioned to lie above and below said first member, extending in the same direction as said first member, with their inner edges in substantial alignment, when the umbrella is closed, flexible tape means secured to the inner edges of all of said last named frame members and to said support, to form hinge connections between said members and support, a flexible covering extending over all of said frame members, adapted to lie in folds when the umbrella is closed, and means for effecting a closure between adjacent edges of said covering when the umbrella is open.

7. In an umbrella, the combination of a single cylindrical vertical support, a plurality of rigid straight frame members hingedly connected thereto at one end of each of the same in such manner as to extend outwardly and downwardly at an angle therefrom and to lie one above the other when closed, and to swing thereabout in such manner as to maintain substantially the same angle thereto at all times when opening, a flexible covering extending over and secured to said members, and means for securing the umbrella in open position.

8. In an umbrella, the combination of a vertical support, a plurality of frame members hingedly connected thereto at one end of each of the same in such manner as to lie in compact arrangement when closed and to swing thereabout into radiating positions when opened, a flexible covering extending over said frame members, a pair of said members being adapted to extend in parallel engaging positions when the umbrella is fully opened, a longitudinal flap hinged to the lower edge of one of said pair adapted to be extended around the lower edge of the other one of said pair when said pair engage, and means for securing said flap in such extended position to said other one of said pair of members.

9. In an umbrella, the combination of a single cylindrical vertical support, a plurality of frame members comprising flat pieces increasing in height from their outer to their inner ends, hingedly connected at their inner ends to said support and adapted to swing thereabout into radiating positions when opened, a flexible covering over the same, and means for securing the umbrella in open position said members being adapted to lie one on another, with the covering disposed in folds one above the other, when the umbrella is closed.

10. In an umbrella, the combination of a vertical support, a paper covering, ribs hingedly connected at one end to said support, and flexible strips secured to said ribs and secured by adhesive to the under side of said covering, said covering being treated with a rain-proof composition.

11. In an umbrella, the combination of a vertical support, a paper covering, cardboard ribs hingedly connected at one end to said support, and flexible strips extending lengthwise of said ribs, extending around the same and pasted to the under side of said covering.

12. In an umbrella, the combination of a vertical cylindical support, a plurality of frame members, adapted to lie one on the other at one side of said support, when the umbrella is closed, a covering extending over said members, and adapted to lie in folds when the umbrella is closed, and a flexible tape constituting a hinge connection between the inner ends of said members and said support.

13. In an umbrella, the combination of a vertical cylindrical support, a plurality of frame members, adapted to lie one on the other at one side of said support, when the umbrella is closed, a covering extending over said members, and adapted to lie in folds when the umbrella is closed, said members comprising strips of cardboard, and a flexible tape constituting a hinge connection between the inner ends of said members and said support.

14. In an umbrella, the combination of a vertical cylindrical support, a plurality of frame members, adapted to lie one on the other at one side of said support, when the umbrella is closed, a covering extending over said members, and adapted to lie in folds when the umbrella is closed, said members comprising flat strips of fibrous material, and a flexible tape constituting a hinge connection between the inner ends of said members and said support, the inner ends of said members being split and folds of said tape being inserted into the openings thus made and secured in position by adhesive.

15. In an umbrella, the combination of a single cylindrical vertical support, a paper covering, and a plurality of cardboard ribs hingedly connected at one end to said support, adapted to swing about said support into radiating positions with their inner ends abutting against said support, when opened, said covering being secured to said ribs.

Signed at New York city in the county of New York and State of New York this 10th day of November A. D. 1921.

OTIS KEAN.
ALBERT R. WILSON.